United States Patent [19]
McConnell

[11] 4,259,798
[45] Apr. 7, 1981

[54] PET TAG HOLDER

[76] Inventor: Paula M. McConnell, 5936 Bryan Pkwy., Dallas, Tex. 75206

[21] Appl. No.: 53,048

[22] Filed: Jun. 28, 1979

[51] Int. Cl.³ .............................................. G09F 3/18
[52] U.S. Cl. ................................. 40/10 R; 40/21 R; 40/300
[58] Field of Search .................. 70/457, 458, 459; 119/106; 40/21 R, 300, 2 A, 10

[56] References Cited

U.S. PATENT DOCUMENTS

| 415,393 | 11/1889 | McKenzie | 40/10 R |
| 1,353,605 | 9/1920 | Napolillo | 40/10 R |
| 1,515,883 | 12/1924 | Stewart | 40/10 R |
| 2,648,150 | 8/1953 | Sullivan | 40/21 C |
| 2,720,777 | 10/1955 | Kocsi | 40/2 A |
| 2,880,701 | 4/1959 | Foster | 119/106 |
| 2,969,668 | 1/1961 | Aitchison | 70/458 |
| 3,687,114 | 8/1972 | Berkstresser | 119/106 |

Primary Examiner—Gene Mancene
Assistant Examiner—Wenceslao J. Contreras
Attorney, Agent, or Firm—Hubbard, Thurman, Turner, Tucker & Glaser

[57] ABSTRACT

A holder for supporting a pair of pet tags while preventing rattling therebetween comprising an elongated base member having means at one end for connection to a pet collar and carrying a post on a second end for engaging a hole in pet tags. A pair of spring arms are carried by the base member and have free ends spaced in opposition about the post to urge the tags against the base member to thereby prevent rattling. In a preferred form the base member comprises a flat plate having dimensions comparable to a pet tag and providing a surface for carrying identifying indicia.

8 Claims, 5 Drawing Figures

4,259,798

PET TAG HOLDER

BACKGROUND OF THE INVENTION

The present invention relates to means for attaching pet tags to pet collars and more particularily to a holder adapted for attaching one or more tags while preventing rattling of the tags.

Domesticated pets such as dogs and cats are generally required by statute to be licensed and vaccinated. Tags indicating the payment of license fees and appropriate vaccination are required to be attached to the pet's collar to indicate that the statutory requirements have been complied with. In addition most pet owners choose to provide at least one additional tag carrying identifying information such as the owner's name and address and the pet's name to aid in recovery of the pet if it should be lost. Thus at least two and sometimes three tags are attached to the pet's collar. These tags are generally made of some type of metal to provide the desired strength and durability. But the metal tags invariably rattle whenever the pet moves and thereby generate an objectionable noise. It would therefore be desireable to provide a means for attaching the required tags to a pet's collar while preventing rattling between the tags and also to provide an identifying tag without adding to the rattling problem.

Most pet owners do not consider the licensing and vaccination tags to be particularly attractive. At professional pet shows these tages must usually be removed during judging. An attractive identifying tag with, for example, a pet's name is desireably left attached to the pet's collar during the judging process. Thus it would be desireable to also provide means for conveniently attaching and removing the required metal tags from the pet's collar while also providing an attractive identification tag for the pet.

SUMMARY OF THE INVENTION

Accordingly an object of the present invention is to provide a pet tag holder for supporting one or more pet tags from a pet's collar while preventing rattling of the tags.

Another object of the present invention is to provide a pet tag holder which may be used as a support for indicia identifying the pet.

Yet another object of the present invention is to provide a pet tag holder which allows required tags to be quickly and easily attached and removed from the pet's collar.

These and other objects of the present invention are achieved by providing a pet tag holder comprising a base member having attachment means on one end for connection to a pet collar, a post carried on a second end extending from the base to engage a hole in one or more pet tags, and a pair of spring arms supported by the base member and each having a free end positioned on opposite sides of the post member for urging pet tags carried on the post against the base member to prevent rattling. In a preferred form the base member comprises a flat plate of sufficient dimensions to receive indicia identifying a pet or its owner.

BRIEF DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

Figure 1:
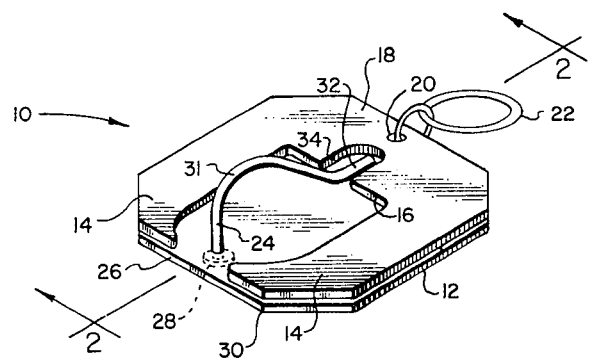
FIG. 1 is a perspective view of a preferred embodiment of the present invention.

With reference now to FIG. 1 a preferred embodiment of the present invention is shown in perspective view designated generally 10. The pet tag holder 10 in the preferred embodiment is constructed from two generally square sheets of somewhat flexible plastic with one forming a base plate 12 having dimensions of about one inch square on which the rest of the tag holder is assembled. A pair of spring arms 14 are formed from the second sheet by cutting out a rectangular window 16 thereby leaving arms 14 connected by a bight portion 18. In this preferred embodiment, the bight portion 18 is bonded to base plate 12 permanently by gluing or heat fusing. A hole 20 is provided through bight portion 18 and base plate 12 for engagement with one or more metal rings 22 for connection to a pet collar. The appropriate number of rings 22 is selected according to the type of pet collar to which the holder is to be attached and a desired orientation of the holder and tags. The final element of the preferred embodiment is a post 24 which extends from a back surface of plate 12 at essentially a right angle and is positioned near a bottom edge 26 opposite the supporting rings 22. One end of post 24 is embedded into the plate 12 by any suitable means. In a preferred form a nail head 28 is formed as an integral part of post 24 and provides a fairly large flat surface which may be bonded to plate 12. For greatest strength the post 24 is inserted through a hole in plate 12 and nail head 28 is bonded to a recess in a front surface 30 of plate 12. In this preferred embodiment post 24 is made from steel and is of sufficiently small diameter to fit through the holes normally provided in license and vaccination tags. A tag retaining arrangement is formed integrally with post 24 and comprises an arcuate extension 31 of the upper end of post 24 which curves back toward the back surface of plate 12 so that an end 32 thereof contacts plate 12 near the hole 20. In this preferred form a small window or recess 34 is provided in bight portion 18 to accomodate the end 32 of the tag retaining arm 30. If desired, the end 32 may be allowed to simply rest upon the bight portion 18 but this form is not preferred since there is some chance of snagging the free end 32.

Figure 2:
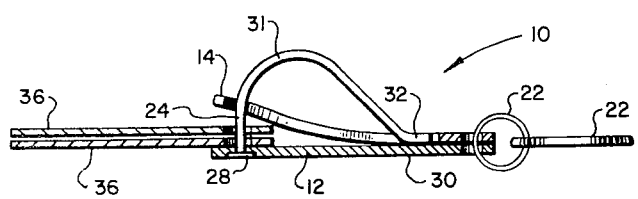
FIG. 2 is a side sectional view of the FIG. 1 embodiment with a pair of pet tags installed.

More details of the FIG. 1 embodiment are illustrated in FIG. 2 where a side sectional view of tag holder 10 is provided with a pair of tags installed in the holder. Elements which are also illustrated in FIG. 1 carry the same designation numbers. As illustrated in FIG. 2 a pair of tags 36 may be installed back to back so that the printed material thereon is completely readable. When two tags 36 are installed on a tag holder 10 as illustrated the post 24 passes through normal holes in the tags to firmly support the tags. In addition the spring arms 14 overlie the upper edges of the tags 36 and force them against the plate 12 greatly reducing motion of tags 36 relative to plate 12 and to each other. The tags 36 are therefore firmly held on the holder 10 by the post 24 and prevented from rattling by arms 14. It can be seen that the arms 14 also act to prevent removal of tags 36 from post 24. But in the preferred embodiment the tag retaining arm 31 is also provided to prevent loss of the tags should they work free of the arms 14. It can be seen that even if tags 36 are positioned above arms 14 some intentional effort is required to remove the tags entirely from the holder. That is, the tags must be moved along the length of retaining arm 31 and the end 32 of the arm 31 must be lifted away from plate 12 to provide sufficent clearance for complete removal of tags 36.

As noted above tag holder 10 is constructed primarily from two flexible plastic sheets, forming base 12 and the other the spring arms 14. Plastic material aids in damping sound which may be generated by contact of the tag holder with other objects. Such material also provides a good surface 30 for receiving printed material identifying the pet or its owner. Surface 30 could also be used to print advertising material for pet products manufacturers who would distribute the tag holders for promotional purposes. For individuals the tag holder 10, or at least base plate 12, may preferably be manufactured from sheet metal stampings. A metal base plate 12 would provide a surface 30 into which identifying information could be stamped in a conventional manner.

In light of the above description the installation of tags to the position shown on FIG. 2 is apparent. The two tags are preferrably placed back to back with their holes in alignment. The arm 31 is then raised from plate 12 and tags 36 are placed onto the arm 31. The tags are then slid down to the post 24 and rotated to the position illustrated in FIG. 2. The tags are then turned about the axis of post 24 to one side so that a first spring arm 14 may be raised and the tags slid thereunder. Tags 36 are then rotated to the second side and the second spring arm 14 is raised so that when the tags 36 are returned to a centered position they lie under both spring arms 14. When thus assembled information on both tags 36 is visible, one from the front and one from the back. In addition any identifying information on the front surface 30 of the holder 10 is also visible. The tag holder is preferrably attached to a pet collar by one or more rings 22 in such a manner that the surface 30 is visible when facing the pet.

Figure 3:
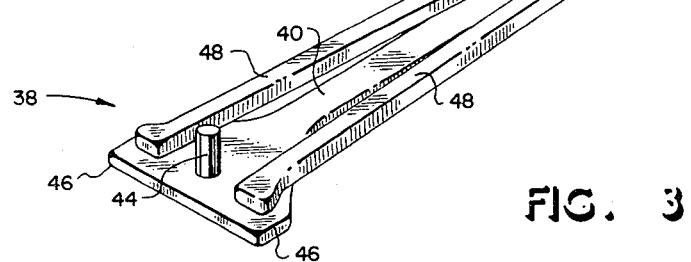
FIG. 3 is a perspective view of a second embodiment of the present invention.

With reference now to FIG. 3 an alternate embodiment of the pet tag holder of the present invention is generally designated 38. In this embodiment the holder is assembled on a generally elongated base member 40 which may have a ring 42 formed integrally at a first end thereof. Member 40 carries a post 44 at a second end opposite ring 42. Member 40 is preferably wider at the second end to provide wings 46 on opposite sides of the post 44. A pair of spring arms 48 each have a first end connected to the base member 40 near connecting ring 42 and a second end overlying each of the wings 46. Tag holder 38 may be constructed from metal stampings joined together by a rivet 50. Thus the spring arms 48 may be stamped from a single piece of metal in a U-shape while base member 40 is stamped in a T-shape with the ring 42 formed from the central leg of the T. Post 44 may be formed from metal and riveted to base member 40. The post 44 may be simply a straight section of a cylinder for holding pet tags in the manner described above while the spring arms 48 prevent the tags from being disengaged from the post. Alternately an arcuate retaining arm may be formed as an extension from the upper end of post 44 in exactly the same fashion as arm 31 of FIGS. 1 and 2. If desired the entire tag holder 38 may be formed from one or two plastic moldings.

Figure 4:
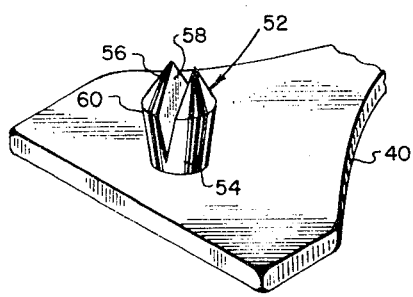
FIGS. 4 and 5 are perspective views of alternate attaching posts for use with the various embodiments of the present invention.

While the post 44 in FIG. 3 is shown as a simple cylinder on which pet tags may be easily installed, various modifications to the post would provide other retaining means to prevent the tags from easily slipping off. FIG. 4 is a perspective view of a post 52 which may be used in place of either post 24 in FIG. 1 or post 44 in FIG. 3. A base portion 54 of this post is attached to base 12 or 40 in any suitable manner including the molding of the post 52 integrally with the support member. The base 54 is of sufficiently small diameter to fit within the holes in the pet vaccination or license tags. Post 52 further has a generally conically shaped upper end 56 and is split along its length at 58 so that an upper portion 60 of post 52 is of diameter larger than the holes in the pet tags 36. When the pet tags 36 are placed on the upper end of posts 52 and pressed downward the conical area 56 forces the two halves of post 52 together so the tag may slip over the portion 60. As the tag is then pushed down towards the base 54, the post reopens and thereby holds the tag on the post 52 in a positive manner. This retaining arrangement is intended only as a safety feature to act in addition to the spring arms 14 or 48.

Figure 5:
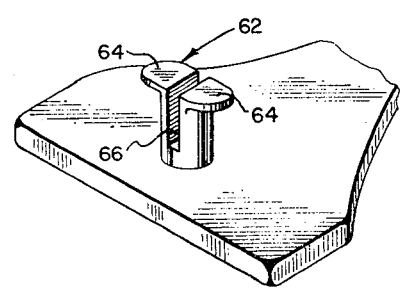

With reference now to FIG. 5 post 62 is illustrated as an alternate to posts 24 or 44. Post 62 has a constant diameter along most of its length and is generally small enough to fit within the holes in pet tags 36. Ears 64 are provided on two sides of post 62 at its upper end and are of sufficient size to prevent a tag carried on post 62 from being easily lifted therefrom. Post 62 is bifurcated, having a slot 66 extending from the upper end to a point near the lower end of post 62. Pet tags 36 may be installed on or removed from the posts 62 by forcing the ears 64 toward each other thereby closing the slot 66 and reducing the diameter of the upper end to the point where it will fit through the holes in the tags. Once installed, the post 62 springs back to the shape illustrated in FIG. 5 so that the ears 64 prevent a tag from falling from post 62. This tag retaining arrangement is again intended to be only a safety feature to prevent loss of tags 36 should they in some manner work free from the spring arms 14 or 48. As with post 52 the post 62 is preferably made from plastic and preferably molded integrally with a base member, such as plate 40.

Various modifications in the apparatus of the present invention will be apparent to those skilled in the art. For example in the FIG. 1 embodiment it may be desireable to anchor post 24 to the base 12 by means of end 32 of the retaining arm 31. The lower end of post 24 would then be fitted within a recess in the base 12 and held there by a spring tension in the arm 31. With such an arrangement the tags 36 could be installed in the position illustrated in FIG. 2 by simply slipping upwards between the base 12 and arms 14 while the spring arm 31 is lifted to take the post 24 out of engagement with the base 12. Then the tags 36 would be positioned to align the tag holes with the recess in base 12 and the arm 31 would be released so that the post 24 would drop through the pet tags and lock into the base 12. With this arrangement the post 24 could be somewhat shorter since the tags 36 would not need to be rotated after being positioned on the spring arm 31. Various other modifications and changes to the present invention can be made within the scope of the appended claims.

I claim:

1. A pet tag holder for supporting a pet tag from a pet collar and reducing rattling comprising:
   a generally flat plate having means near a first edge for connection to a pet collar,
   a post supported on a first surface of said plate near a second edge for engaging a hole in a pet tag,
   first and second spring arms each having first ends bonded to said first surface of said plate and second ends positioned on opposite sides of said post near said second edge for engaging a pet tag supported on said port and urging it against said first surface.

2. A pet tag holder according to claim 1 further including identifying indicia carried on a second surface of said plate.

3. A pet tag holder according to claim 1 further including retaining means carried on the end of said post for resisting removal of a pet tag carried on said post.

4. A pet tag holder according to claim 3 wherein said post is metal and said retaining means is a continuation of said post extending arcuately to a point adjacent said first surface near said first edge.

5. A pet tag holder according to claim 3 wherein said post is plastic and said retaining means comprises an enlarged portion on an end of said post opposite said first surface.

6. A pet tag holder according to claim 5 wherein said post comprises two spaced apart portions whereby said enlarged portion may be compressed to facilitate attachment and removal of a pet tag.

7. A pet tag holder for supporting a pet tag from a pet collar comprising:
   an elongated base member having means at a first end for connection to a pet collar;
   a post carried on a second end of said base member and extending from said base at about a right angle for engaging a hole in one or more pet tags,
   first and second spring arms each having first ends supported by said first end of said base member and each having second ends positioned on opposite sides of said post for urging a pet tag carried on said post against said base member.

8. A pet tag holder according to claim 7 further including retaining means carried on an end of said post opposite said base for resisting removal of a pet tag carried on said post.

* * * * *